United States Patent
Lee et al.

(10) Patent No.: US 10,724,115 B2
(45) Date of Patent: Jul. 28, 2020

(54) MAGNETITE-BASED SINTERED ORE AND METHOD OF PRODUCING SAME

(71) Applicant: Korea University Research and Business Foundation, Seoul (KR)

(72) Inventors: Joonho Lee, Gyeonggi-do (KR); Joon Seok Oh, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 226 days.

(21) Appl. No.: 15/704,401

(22) Filed: Sep. 14, 2017

(65) Prior Publication Data

US 2018/0002779 A1    Jan. 4, 2018

Related U.S. Application Data

(63) Continuation of application No. PCT/KR2016/002657, filed on Mar. 16, 2016.

(30) Foreign Application Priority Data

Mar. 17, 2015    (KR) .......................... 10-2015-0036717

(51) Int. Cl.
*C22B 1/16*    (2006.01)
*C22B 4/00*    (2006.01)

(52) U.S. Cl.
CPC . *C22B 1/16* (2013.01); *C22B 4/00* (2013.01)

(58) Field of Classification Search
CPC .................................... C22B 1/16; C22B 4/00
USPC ....... 75/10.13, 319–321, 765–767; 23/313 R
See application file for complete search history.

(56) References Cited

U.S. PATENT DOCUMENTS

| 1,729,496 | A | * | 9/1929 | Simpson | .................. C22B 1/24 |
| | | | | | 75/307 |
| 6,277,168 | B1 | | 8/2001 | Huang et al. | |
| 8,034,320 | B2 | * | 10/2011 | Rundel | .................. C22B 1/216 |
| | | | | | 423/632 |
| 2005/0050996 | A1 | * | 3/2005 | Gannon | .................. B30B 11/16 |
| | | | | | 75/751 |
| 2011/0068521 | A1 | | 3/2011 | Rundel | |

FOREIGN PATENT DOCUMENTS

| CN | 19848520 A | * | 4/2007 |
| CN | 101568656 A | | 10/2009 |
| JP | H0617152 A | | 1/1994 |
| JP | 09-118936 A | | 5/1997 |
| JP | 2001-294945 A | | 10/2001 |
| JP | 2006-104528 A | | 4/2006 |

(Continued)

OTHER PUBLICATIONS

CN 19848520 A machine translation of the description (Year: 2006).*

(Continued)

*Primary Examiner* — Tima M. Mcguthry-Banks
(74) *Attorney, Agent, or Firm* — Mintz Levin Cohn Ferris Glovsky and Popeo, P.C.; Peter F. Corless

(57) ABSTRACT

This invention relates to magnetite-based sintered iron ore wherein a magnetite ore powder, which is not currently utilized owing to its low reducibility index among iron ore materials serving as a main material in iron-making processes, is improved so as to have a high reducibility index, and to a method of manufacturing the same.

4 Claims, 2 Drawing Sheets

(56) References Cited

FOREIGN PATENT DOCUMENTS

| | | |
|---|---|---|
| JP | 2006-104567 A | 4/2006 |
| JP | 2011-184718 A | 9/2011 |
| JP | 5463571 B2 | 4/2014 |
| KR | 10-1999-0076960 A | 10/1999 |
| KR | 10-2004-0034995 A | 4/2004 |
| KR | 10-2008-0109808 A | 12/2008 |
| KR | 10-2014-0094427 A | 7/2014 |
| SK | 281735 * | 4/2001 |

OTHER PUBLICATIONS

Office Action for Chinese Application No. 201680016512.4 from State Intellectual Property Office of People's Republic of China, dated Jun. 19, 2018, 18 pages, English translation.

* cited by examiner

MAGNETITE-BASED SINTERED ORE AND METHOD OF PRODUCING SAME

CROSS-REFERENCE TO RELATED APPLICATIONS

This application is a continuation application of International Application No. PCT/KR2016/002657 filed on Mar. 16, 2016, which claims priority to Korean Application No. 10-2015-0036717 filed on Mar. 17, 2015. The applications are incorporated herein by reference.

TECHNICAL FIELD

The present invention relates to magnetite-based sintered iron ore having a high reducibility index and a method of manufacturing the same.

BACKGROUND ART

In iron-making processes, sintered iron ore, which is mainly manufactured from hematite ore, is charged in a blast furnace to produce metallic iron. To manufacture sintered iron ore, the hematite ore, which is a main material, is mixed with carbonaceous materials, additives (e.g. calcium oxide (CaO) or the like) and iron-containing by-products (dust, sludge, mill scale, etc.) and then heated to a temperature ranging from 1300 to 1480° C. In order to prevent the breakage of the sinter when it is transported and charged into a blast furnace, high cold strength is required. In addition, fine powder generation due to volume expansion of about 20% and consequent internal stress in the sinter when hematite is reduced to magnetite should be minimized while maintaining a high reducibility index.

Meanwhile, magnetite ore is mainly obtained in the form of ultrafine powder (about 0.2 mm or less) and has a low reducibility index, and thus the usability thereof in an iron-making process is limited. More specifically, when magnetite ore is directly used as sintered iron ore, cracking cannot be expected when hematite is reduced into magnetite. Accordingly, internal gas diffusion becomes slow, and it is difficult to realize high reducibility. Hence, most techniques that have been developed for manufacturing sintered iron ore use hematite as a main material. For this reason, upon manufacturing the sintered iron ore, the magnetite ore is used in a manner in which a portion thereof is combined with hematite ore. However, when the magnetite is used as a main material, it is anticipated that there is no problem of fine power generation during the reduction, unlike hematite. The magnetite ore is a candidate material to be utilized as sintered iron ore as long as it satisfies cold strength and high reducibility index. Since the magnetite is obtained in the form of ultrafine powder, it must be subjected to a sintering process in order to be used for the iron-making operation in a blast furnace.

Furthermore, techniques, known to date, that utilize magnetite ore include: the formation of compounds having low melting points by irradiating a mixture of magnetite (or hematite) and CaO with microwaves; and manufacturing hematite pellets from a green pellet of a magnetite-water-flux-binder mixture. However, a technology for directly utilizing sintered magnetite ore in an iron-making process has not yet been introduced.

Korean Patent Application Publication No. 10-2004-0034995 discloses sintered iron ore having a high reducibility index and low reduction degradation and a method of manufacturing the same, in which a flux additive is used in a large amount, and consequently the slag volume is increased during the blast furnace processing. Therefore, the coke ratio is undesirably increased.

SUMMARY

Accordingly, the present invention has been made keeping in mind the problems encountered in the related art, and the present invention is intended to provide magnetite-based sintered iron ore, which is manufactured from magnetite, serving as a main material, and in which, upon manufacturing the sintered iron ore, even when carbonaceous materials and various additives are not added or are added in small amounts compared to conventional sintered iron ore production, magnetite-based sintered iron ore having good cold strength, a high reducibility index and low reduction degradation may be obtained.

Therefore, the present invention provides magnetite-based sintered iron ore, which is manufactured by irradiating magnetite ore or a magnetite ore mixture with microwaves and has a maximum compressive strength of about 1.281 kN or more, or a maximum compressive stress of 16.31 MPa or more.

In addition, the present invention provides a method of manufacturing magnetite-based sintered iron ore, comprising a) compacting a magnetite ore powder or a magnetite ore powder mixture into a magnetite ore lump with pressure and b) heating and sintering the magnetite ore lump prepared in a) at a temperature of 1100° C. or above through microwave irradiation.

According to the present invention, magnetite-based sintered iron ore contains none or a small amount of carbon (about 2% coke and about 2% anthracite coal, etc.) used for typical sintered iron ore production, thus the present invention has a merit in decreasing the emission of carbon dioxide and the generation of dust that is harmful to the environment. Furthermore, an additive (flux) such as limestone, quicklime, serpentine or quartzite, added to ensure strength and to suppress fine powder generation during the sintering of iron ore, is not added, or is added in a small amount (about 15%), thus decreasing the slag volume upon blast furnace operation, thereby helping realize a low coke ratio.

Also, the magnetite ore powder is an iron source that is not used owing to its low reducibility index, and the magnetite-based sintered iron ore of the present invention can increase the usability of magnetite ore, thus enabling the free selection of raw materials in the iron-making industry.

Also, when the magnetite-based sintered iron ore according to the present invention is used, rapid reduction is possible, and iron productivity, which indicates the efficiency of a blast furnace, can be increased, resulting in increased energy efficiency. Upon manufacturing the magnetite-based sintered iron ore of the present invention, carbon and additives are not added, or are added in small amounts to thus decrease the slag volume and to function as a rapid reducing agent, thereby exhibiting significantly improved effects in terms of energy, environmental impact, and cost compared to conventional sintered iron ore.

DETAILED DESCRIPTION

Figure 1:
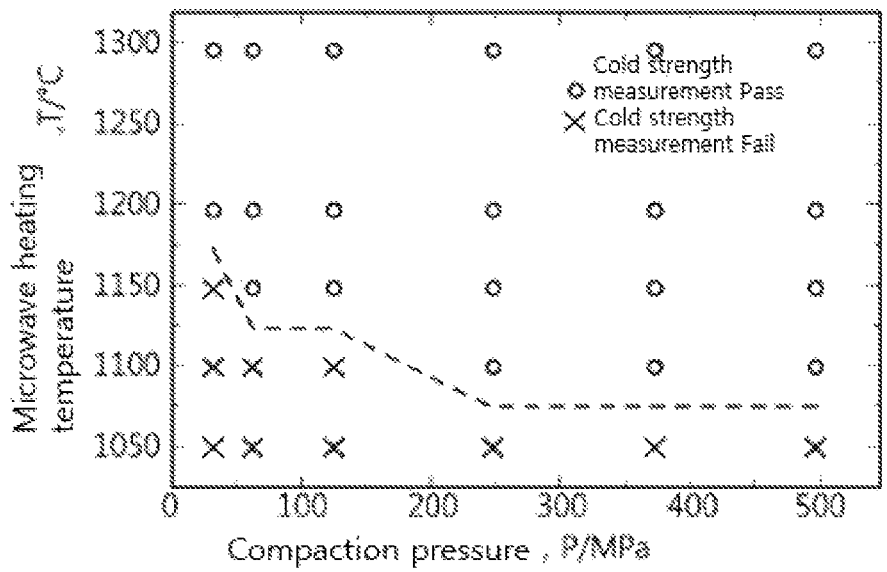
FIG. 1 is a graph showing the cold strength of magnetite-based sintered iron ore depending on the pressure applied upon compaction of the magnetite-based sintered iron ore according to the present invention and on the heating temperature range through microwave irradiation.

Hereinafter, a detailed description will be given of the present invention.

The present invention addresses magnetite-based sintered iron ore obtained by irradiating magnetite ore or a magnetite ore mixture with microwaves and a method of manufacturing the same.

In the present invention, the production of magnetite-based sintered iron ore having high cold strength and a high reducibility index by irradiating magnetite ore, which is an iron source that is not typically utilized owing to its low reducibility index, serving as a main material, with microwaves under predetermined conditions has been experimentally confirmed.

Specifically, the present invention pertains to magnetite-based sintered iron ore, which is obtained by irradiating magnetite ore or a magnetite ore mixture with microwaves and has a reducibility index at a reduction rate of 0.7%/min or more at 1000° C. in a 40% CO-60% $N_2$ gas atmosphere. According to the present invention, the magnetite-based sintered iron ore may be provided in the form of a pellet having a diameter of 5 to 50 mm or a briquette having a diameter of 5 to 50 mm and a height of 5 to 50 mm, may satisfy a KS E 3714 standard, and may have a maximum compressive strength in a bottom direction of about 1.281 kN or more and a maximum compressive stress of 16.31 MPa or more. Also, a maximum compressive strength in a lateral direction is preferably 0.4011 kN or more.

In a typical sintering process, thermal energy is applied from the outside, and the outside of a sample is first sintered. In the present invention, the entire sample may be simultaneously heated using microwaves, whereby the entire sample may be uniformly sintered, thus making it possible to manufacture a sintered body that facilitates gas diffusion and has a high reducibility index.

In the present invention, the heating temperature achieved through microwave irradiation may be 1100 to 2000° C. When the heating temperature through microwave irradiation is 1200° C. or more, the cold strength of the magnetite-based sintered iron ore may be ensured regardless of the pressure that is applied to compact the magnetite ore. When a pressure of 62 MPa or more is applied, the optimal heating temperature may be decreased to 1150° C. or more, and when a pressure of 250 MPa or more is applied, the optimal heating temperature may be decreased down to 1100° C. or more. In order to protect a refractory material upon sintering, the maximum heating temperature is preferably 2000° C. or less.

In the present invention, the microwaves may be applied in the range of 0.5 to 300 kW using a single microwave generator so that the heating temperature is 1100° C. or more.

When microwave generators are combined by being used in parallel, the amount of power that is output may be calculated by multiplying the power of each microwave generator to the number of the generator (power of each generator*number of generator), and the total energy may be increased by using multiple microwave generators simultaneously. In this case, the microwave power may exceed 300 kW.

The magnetite ore of the present invention may be a magnetite ore powder, but the present invention is not limited thereto, and magnetite ore may be included in ultrafine powder form (about 0.2 mm or less) having a low reducibility index.

The magnetite ore mixture may further include, in addition to the magnetite ore, at least one selected from among hematite ore, a carbonaceous material and an additive.

The carbonaceous material includes at least one of coke and anthracite coal. The carbonaceous material is preferably contained in an amount of 4 wt % or less based on the total weight of the mixture.

The additive may be a flux, and may specifically include at least one selected from among limestone, quicklime, serpentine and quartzite. The additive may be contained in an amount of 15 wt % or less based on the total weight of the mixture.

When the carbonaceous material or the additive is added within the above amount range, it may be contained in a smaller amount compared to conventional sintered iron ore production processes, thus decreasing the emission of carbon dioxide and the generation of dust that is harmful to the environment. Furthermore, the slag volume is decreased upon blast furnace operation, thus contributing to a decreased coke ratio, resulting in superior energy efficiency.

When the magnetite ore mixture includes hematite ore, the weight ratio of magnetite ore and hematite ore may range from 6:4 to 10:0, that is, the amount of magnetite ore may exceed 60% of the total amount thereof. When the amount of magnetite is 60% or less, the rate of heating of the sample is slowed, thus remarkably lowering efficiency.

The size of the magnetite-based sintered iron ore according to the present invention is not particularly limited, and it may be provided in the form of a pellet having a diameter of 5 to 50 mm or a briquette having a diameter of 5 to 50 mm and a height of 5 to 50 mm. In some cases, upon continuous operation, it may be manufactured in the form of a column using a process such as extrusion or the like. Here, column-shaped sintered iron ore having a diameter of 5 to 50 mm is manufactured and then cut before use.

In addition, the present invention addresses a method of manufacturing magnetite-based sintered iron ore, comprising: a) compacting magnetite ore or a magnetite ore mixture into a magnetite ore lump using pressure; and b) heating and sintering the magnetite ore lump prepared in a) at a temperature of 1100° C. or above through microwave irradiation.

In a), the pressure may be with in the range of 30 MPa to 10 GPa, and is preferably 30 to 500 MPa, but the present invention is not limited thereto. When the pressure is less than 30 MPa, compaction into a lump is impossible, and 10 GPa is the maximum pressure that can be expected in a typical manufacturing process.

The pressure may be applied using a hydraulic press, a mechanical press, an injection molding machine, or an extruder, but the present invention is not limited thereto.

In addition thereto, for a description of the method of manufacturing the magnetite-based sintered iron ore according to the present invention, reference is to be made to the above description of the magnetite-based sintered iron ore.

EXAMPLES

A better understanding of the present invention may be obtained via the following examples, which are set forth to illustrate, but are not to be construed as limiting the scope of the present invention. The scope of the present invention is given by the claims, and also contains all modifications within the meaning and range equivalent to the claims.

Example 1

Manufacture of Magnetite-Based Sintered Iron Ore Using Microwave Irradiation 3 g of magnetite ore in ultrafine powder form (about 0.2 mm or less) and having a low reducibility index was compacted (diameter: 10 mm, height: 10 mm) at a pressure of 250 MPa and heated to 1200° C. through irradiation of a 1.8 kW microwave at 2.45 GHz, thus manufacturing sintered iron ore.

Sample treatment conditions were as follows.
Sample weight: ~3 g
Sample particle size: <0.2 mm
Compaction pressure: 250 MPa (maintained for 5 min)
Maximum temperature: 1200° C.
Heating rate: 125 to 160° C./min

Comparative Example 1

Manufacture of Magnetite-Based Sintered Iron Ore Using Typical Resistance Furnace The magnetite ore used in Example 1 was sintered in a general manner in a typical resistance furnace, thus manufacturing magnetite-based sintered iron ore.

Sample weight: ~3 g
Sample particle size: <0.2 mm
Compaction pressure: 250 MPa (maintained for 5 min)
Maximum temperature: 1200° C.
Heating rate: 10° C./min

Test Example 1

Evaluation of Properties of Magnetite-Based Sintered Iron Ore

Density and porosity of the magnetite-based sintered iron ores of Example 1 and Comparative Example 1 were measured using gas pycnometry and DryFlo pycnometry. The absolute density may be measured through gas pycnometry. One of two reactors having the same volume was filled with an analytical sample, and the other was kept empty, and helium gas was injected in the same volume into each of the reactors. The volume of the sample was determined based on the pressure difference between the two reactors. Here, since even the fine pores of the sample are completely filled with helium gas, the volume of only the sample from which pores and the like are excluded may be measured, from which the absolute density of the sample may be determined. The apparent density may be measured using Dryflo pycnometry. As an analytical medium, DryFlo is a dry fine-powdery free fluid, and does not infiltrate pores having a diameter of about 25 μm or less. The measurement method is performed in a manner in which the apparent density may be determined by measuring a volume difference when only DryFlo is added and predetermined pressure is applied and when the sample is enveloped with DryFlo and then charged to the same pressure. The porosity may be determined using a difference between the absolute density and the apparent density using the two methods. The results are shown in Table 1 below.

TABLE 1

| Substance manufacturing method | Absolute density (g/cm$^3$) | Apparent Density (Avg. Envelope density) (g/cm$^3$) | Porosity (%) |
|---|---|---|---|
| Microwave sintering; Example 1) | 4.9260 | 3.8535 | 21.772 |
| Resistance furnace sintering; Comparative Example 1) | 4.9279 | 3.7072 | 24.773 |

As is apparent from Table 1, there were no great changes in the densities of the magnetite-based sintered iron ores of Example 1 and Comparative Example 1 upon the above treatments, and the porosity was further decreased upon microwave sintering.

Test Example 2

Cold Strength of Magnetite-Based Sintered Iron Ore Depending on Pressure Applied Upon Compaction and on Heating Temperature Through Microwave Irradiation Magnetite-based sintered iron ore was manufactured through microwave irradiation in the same manner as in Example 1, with the exception that the pressure applied to compact the magnetite ore was 30 to 500 MPa and that the heating temperature through microwave irradiation was set to each of 1050° C., 1100° C., 1200° C., 1300° C., and 1400° C.

In order to measure the cold strength of the magnetite-based sintered iron ore manufactured by the method of Example, a falling test was performed in accordance with KS E 3714, and a weight loss of 2% or less was satisfied.

The detailed testing method was as follows. Specifically, the sample was lifted up to a height of 2.0 m from the steel shelf and then dropped onto the steel shelf. The above procedure was repeated four times, and the case where the total weight loss was 2.0% or more when compared to the weight before the test (in accordance with KS E 3714) was represented as Fail (X), and the case where the total weight loss was less than 2.0% was represented as Pass (O). The results are shown in FIG. 1.

As shown in the test results of FIG. 1, when the heating temperature through microwave irradiation is 1200° C. or more, the cold strength of the magnetite-based sintered iron ore may be ensured, regardless of the pressure applied to compact the magnetite ore. When the pressure is 62 MPa or more, the optimal heating temperature is lowered to 1150° C. or more, and when the pressure is 250 MPa or more, the optimal heating temperature may be decreased down to 1100° C. or more. In order to protect a refractory material upon sintering, the maximum heating temperature is preferably 2000° C. or less.

Test Example 3

Maximum Compressive Strength of Magnetite-Based Sintered Iron Ore Depending on Pressure Applied Upon Compaction and on Heating Temperature Through Microwave Irradiation Magnetite-based sintered iron ore was manufactured through microwave irradiation in the same manner as in Example 1, with the exception that the pressure applied to compact the magnetite ore was 30 to 500 MPa and that the heating temperature through microwave irradiation was set to each of 1050° C., 1100° C., 1200° C., 1300° C., and 1400° C.

The maximum compressive strength of the magnetite-based sintered iron ore manufactured through microwave irradiation according to the present invention was measured using a universal testing machine as follows.

Figure 4:
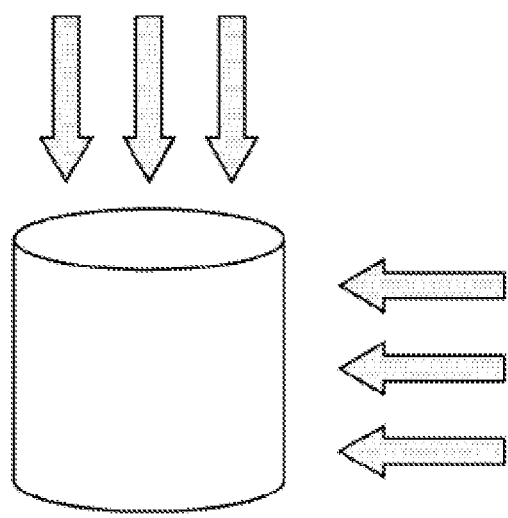
FIG. 4 shows the measurement direction for measuring the compressive strength in Test Example of the present invention.

Sample shape: Cylindrical sintered iron ore (diameter: 10 mm/height: 10 mm)
Measurement device: Universal testing machine
Measurement conditions: Compression at a rate of 0.5 mm/min
Measurement direction: Compression in bottom direction and lateral direction (FIG. 4)
The results are shown in Table 2 below.

TABLE 2

| | | Cold strength measurement results | | |
|---|---|---|---|---|
| Compaction conditions | | Max. | | |
| Compaction pressure (MPa) | Microwave heating temp. (° C.) | compressive strength (kN)-Bottom direction | Max. compressive stress (MPa) | Cold strength (KS E 3714) |
| 250 | 1050 | 0.467 | 5.947 | Fail |
| 375 | 1050 | 0.914 | 11.640 | Fail |
| 500 | 1050 | 1.204 | 15.330 | Fail |
| 250 | 1100 | 2.260 | 28.780 | Pass |
| 62.5 | 1150 | 2.319 | 29.530 | Pass |
| 125 | 1150 | 3.337 | 42.490 | Pass |
| 31.25 | 1200 | 2.099 | 26.730 | Pass |
| 125 | 1200 | 1.376 | 17.520 | Pass |
| 250 | 1200 | 2.888 | 36.770 | Pass |
| 375 | 1300 | 1.281 | 16.310 | Pass |
| 500 | 1300 | 6.08 | 77.410 | Pass |
| 625 | 1300 | 1.596 | 20.320 | Pass |
| 750 | 1300 | 1.644 | 20.930 | Pass |
| 750 | 1400 | 11.79 | 150.100 | Pass |

As is apparent from the above test results, only the magnetite-based sintered iron ore satisfying the maximum compressive strength of 1.281 kN/maximum compressive stress of 16.31 MPa or more passed the cold strength test (KS E 3714).

Test Example 4

Evaluation of Reducibility Index of Magnetite-Based Sintered Iron Ore

Magnetite-based sintered iron ore was manufactured through microwave irradiation in the same manner as in Example 1, with the exception that the pressure applied to compact the magnetite ore was 30 and 500 MPa and that the heating temperature through microwave irradiation was set to each of 1100° C., 1200° C., and 1300° C.

The magnetite-based sintered iron ore obtained through microwave irradiation and the magnetite sintered iron ore having the same shape manufactured using a typical resistance furnace of Comparative Example 1 were subjected to a reduction test.

Specifically, the sintered iron ore was charged into a quartz reaction tube (inner diameter of 30 mm) in a vertical furnace at 1000° C. Then, a gas mixture of nitrogen and carbon monoxide (nitrogen ($N_2$) of 4.8 L/min STP, carbon monoxide (CO) of 3.2 L/min STP) was allowed to flow, and the reducibility index was measured.

The reduction ratio was calculated using the following Equation 1.

[Reduction ratio](%)=[amount of oxygen reduced in iron ore]/[amount of oxygen bonded with iron in iron ore before reaction]×100    [Equation 1]

Figure 2:
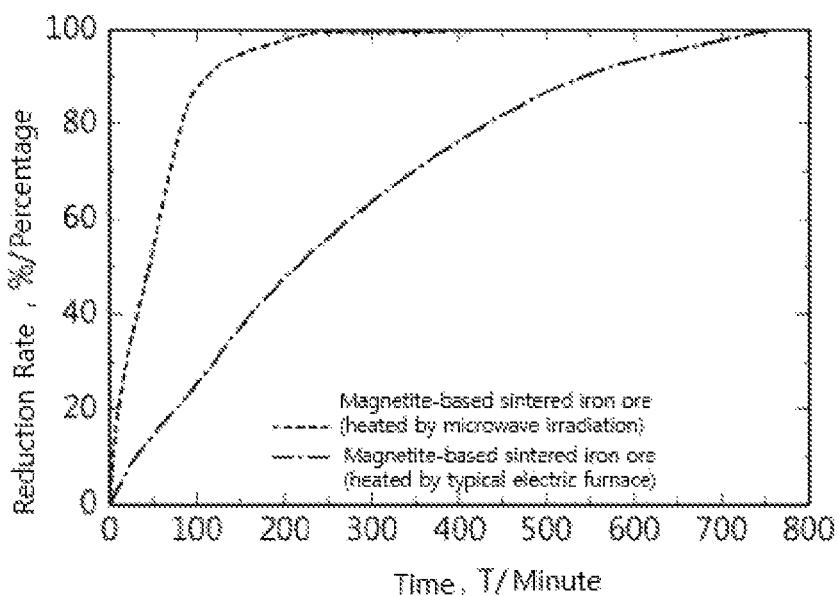
FIG. 2 is a graph showing the results of evaluation of reducibility index based on the reduction ratio over time of the microwave sintered iron ore according to the present invention.
Figure 3:
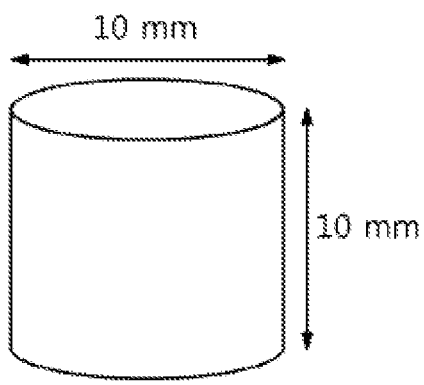
FIG. 3 shows the shape of the microwave sintered iron ore produced in Example of the present invention.

The results of evaluation of reducibility index of sintered iron ore irradiated with microwaves are shown in FIG. 2.

With reference to the test results of FIG. 2, the magnetite sintered iron ore according to the present invention, sintered using microwaves, exhibited a reduction rate as high as about 4 times that of the magnetite sintered iron ore sintered in a typical resistance furnace (Comparative Example 1; Conventionally heated magnetite).

When the magnetite-based sintered iron ore manufactured using a typical electric furnace was 50% reduced, the reduction rate was 0.17%/min, and when the magnetite-based sintered iron ore manufactured through microwave irradiation according to the present invention was 50% reduced, the reduction rate was 0.58 to 0.82%/min, and the reaction rate was increased about 4 times through microwave irradiation. The results of reduction rate depending on the microwave heating temperature under compaction conditions are shown in Table 3 below.

TABLE 3

| | Compaction conditions | | |
|---|---|---|---|
| No | Compaction pressure (MPa) | Microwave heating temperature (° C.) | dR/dt (%/min) |
| 1 | 250 | 1100 | 0.73 |
| 2 | 250 | 1200 | 0.78 |
| 3 | 250 | 1300 | 0.82 |
| 4 | 500 | 1300 | 0.58 |

Test Example 5

Measurement of Cold Strength of Hematite-Magnetite Mixed Sintered Iron Ore

Hematite-magnetite mixed sintered iron ore was manufactured in the same manner as in Example 1, with the exception that hematite ore and magnetite ore (powder) were mixed and that the heating temperature through microwave irradiation was 1000° C. and 1100° C.

The cold strength thereof was measured in the same manner as in Test Example 2. The results are shown in Table 4 below.

TABLE 4

| Sintering temperature (° C.) | 1000 | 1100 |
|---|---|---|
| Magnetite:Hematite = 7:3 | Fail | Pass |
| Magnetite:Hematite = 9:1 | Fail | Pass |

As is apparent from the results of Table 3, when the mixed ore was sintered at 1100° C. or more, as in the magnetite ore, the required cold strength was satisfied regardless of the mixing ratio. Here, the sintering time was increased with a decrease in the amount of magnetite, which means that the amount of hematite that is added may be adjusted by the user so as to be suitable for the site conditions. Thus, the present invention provides sintered iron ore composed mainly of magnetite, and may also be applied to sintered iron ore composed mainly of magnetite and further including hematite and various additives for use in typical sintered iron ore.

According to the present invention, magnetite-based sintered iron ore contains none or a small amount of carbon (about 2% coke and about 2% anthracite coal) used for typical sintered iron ore production, thus decreasing the emission of carbon dioxide and the generation of dust that is harmful to the environment. Furthermore, an additive (flux) such as limestone, quicklime, serpentine or quartzite, which is conventionally added to ensure strength and to suppress fine powder generation during the sintering of iron ore, is not added or is added in a small amount (about 15%), thus decreasing the slag volume upon blast furnace operation, thereby contributing to a decreased coke ratio.

The invention claimed is:

1. A method of manufacturing a magnetite-based sintered iron ore, comprising:
   a) compacting a magnetite ore powder or a magnetite ore powder mixture into a magnetite ore lump using a pressure of 30 to 500 MPa; and
   b) sintering the magnetite ore lump prepared in a) at a temperature of 1100° C. or above through microwave irradiation,
   wherein the magnetite-based sintered iron ore has a reducibility index at a reduction rate of 0.7%/min or more in a 1000° C. 40% CO-60% $N_2$ gas atmosphere,
   wherein when a pressure of 250 MPa or more to 500 MPa or less is applied to the magnetite ore lump in step a), the heating temperature through microwave irradiation is 1100° C.~2000° C. in step b),
   when a pressure of 62 MPa or more to 250 MPa or less is applied to the magnetite ore lump in step a), the heating temperature through microwave irradiation is 1150° C.~2000° C. in step b),
   when a pressure of 30 MPa or more to 62 MPa or less is applied to the magnetite ore lump in step a), the heating temperature through microwave irradiation is 1200° C.~2000° C. in step b),
   wherein the magnetite ore or the magnetite ore mixture itself is sintered by the steps of a) to b) and used directly as a sintered ore, and
   wherein the magnetite ore powder mixture further comprises at least one of a hematite ore, a carbonaceous material, and an additive, in addition to the magnetite ore powder.

2. The method of claim 1, wherein the magnetite-based sintered iron ore has a maximum compressive strength in a bottom direction of about 1.281 kN or more and a maximum compressive stress of 16.31 MPa or more.

3. The method of claim 2, wherein the magnetite-based sintered iron ore has a maximum compressive strength in a lateral direction of 0.4011 kN or more.

4. The method of claim 1, wherein the hematite ore is contained so that an amount of the magnetite ore powder is 60 wt % or more based on a total weight of the magnetite ore powder and the hematite ore.

* * * * *